United States Patent [19]

McFadden

[11] 3,898,714

[45] Aug. 12, 1975

[54] PIPE ALIGNMENT CLAMP

[76] Inventor: James D. McFadden, 2300 Jefferson Ave., Anchorage, Alaska 99503

[22] Filed: Oct. 9, 1973

[21] Appl. No.: 404,491

[52] U.S. Cl................ 24/81 PE; 219/161; 269/43; 285/286
[51] Int. Cl.².... A44B 21/00; B25B 1/20; B23K 5/22
[58] Field of Search............. 24/81 PE; 219/61, 101, 219/161; 269/37, 43; 285/286, 21, 22

[56] References Cited
UNITED STATES PATENTS

| | | | |
|---|---|---|---|
| 2,753,428 | 7/1956 | Graham | 285/286 X |
| 2,795,689 | 6/1957 | McNutt | 285/286 X |
| 2,813,374 | 11/1957 | Bouwman et al. | 269/37 X |
| 2,922,872 | 1/1960 | Dilling | 219/161 |
| 3,030,903 | 4/1962 | Morris | 269/43 X |
| 3,052,461 | 9/1962 | Bateman | 269/43 |
| 3,414,950 | 12/1968 | Phariss | 219/161 X |
| 3,461,540 | 8/1969 | Rieppel et al. | 219/61 X |
| 3,512,229 | 5/1970 | Phariss | 219/161 X |
| 3,571,908 | 3/1971 | Pilia | 219/61 X |
| 3,595,463 | 7/1971 | Fadeev et al. | 228/44 |
| 3,711,920 | 1/1973 | Simmons | 269/43 X |
| 3,722,038 | 3/1973 | Arntz | 24/81 PE |

Primary Examiner—Donald A. Griffin
Attorney, Agent, or Firm—Klarquist, Sparkman, Campbell, Leigh, Hall & Whinston

[57] ABSTRACT

A pipe alignment clamp holds a pair of pipe sections in coaxial alignment for welding and includes a cylindrical band which is secured to a first pipe section, the band being larger in diameter than such first pipe section and provided with centering bolts for engaging the first pipe section. The band comprises two semicircular segments which are hingedly connected and adapted to be locked over the first pipe section. Mounted upon the band are pairs of lever dogs pivotally supported by the band, wherein means are employed for rotating said dogs relative to the band causing forward ends of the dogs to grasp a second pipe section in coaxial alignment with the first. The lever dogs extend outwardly from the second pipe section to provide a gap under the dogs between the pipe sections to permit welding therebetween. In one embodiment, the means for rotating the dogs comprises hydraulic cylinders mounted upon the band.

27 Claims, 8 Drawing Figures

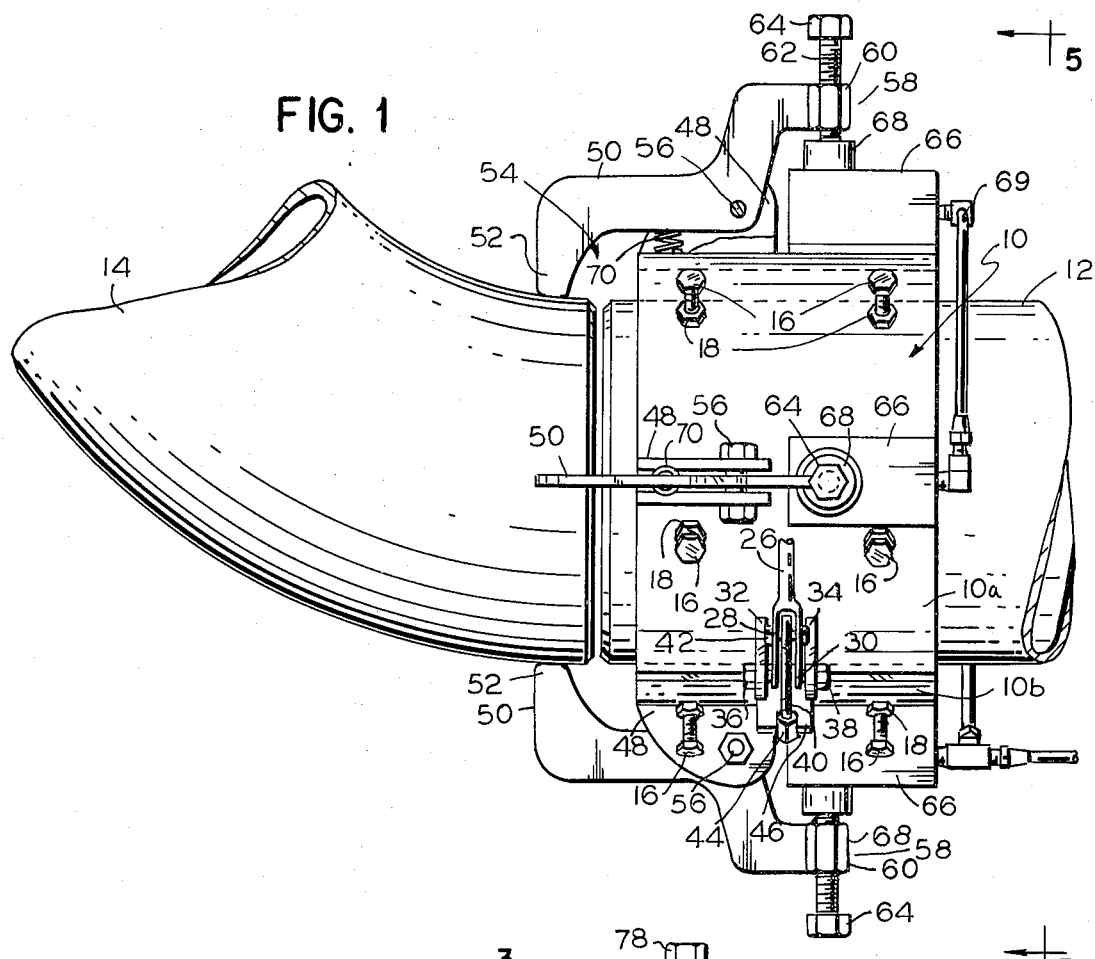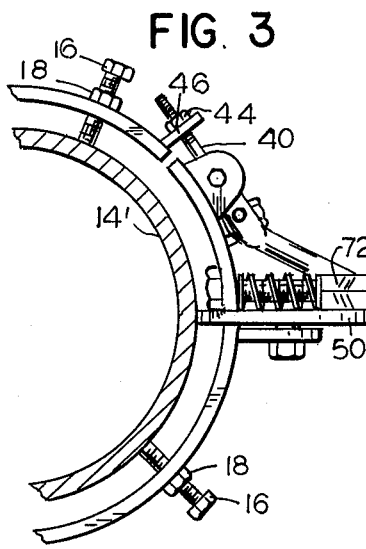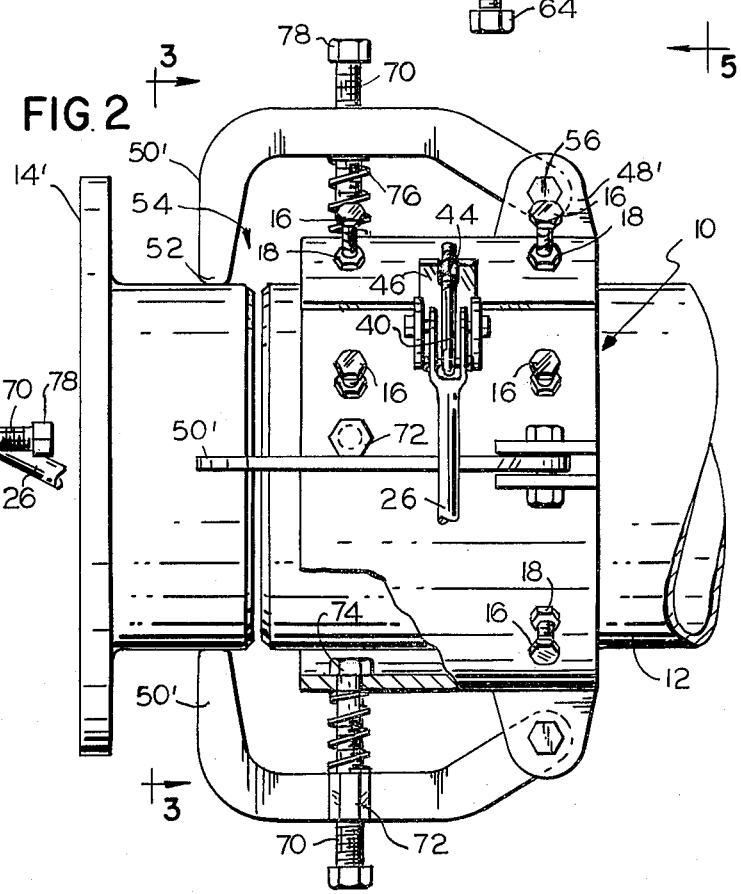

PATENTED AUG 12 1975 3,898,714

SHEET 3

3,898,714

PIPE ALIGNMENT CLAMP

BACKGROUND OF THE INVENTION

In the welding of pipes for pipe lines and the like it is desirable to accomplish a fit of the joints in the shortest possible time in order to reduce production costs to a minimum. Various devices have been employed for holding the pipe sections and keeping them in coaxial alignment while welding is accomplished, including mandrel type means which may be disposed internally of a pair of pipe sections and removed after the welding is completed. Unfortunately, this type of structure is not adapted to "ells", T's, and various pipe fittings where the mandrel either cannot be inserted or cannot be removed after the welding is accomplished.

Various devices have been suggested or employed for attachment to the exterior of the pipe sections. Such devices either make it difficult to accomplish the weld without the removal of the clamping device before the weld is completed because of the lack of access to the joint, or considerable time may be consumed in attaching such devices to the pipe sections. In one case, such a device includes arched bars which are chained to the exterior of the pipes.

SUMMARY OF THE INVENTION

In accordance with the present invention, a band is removably attachable to one of the pipe sections and is provided with movable dogs having ends for engaging the second of the pipe sections. Operating means, suitably mounted upon the band, are employed for bringing about relative movement between the band and the aforementioned ends of the movable dogs. In a particular embodiment, the band comprises two hingedly related semi-circular segments which may be separated to permit placement of the band upon a first pipe section and to permit removal of the same therefrom, with the band also being provided with locking means for engaging the two semi-circular segments in clamping relation with the first of the pipe sections. In one embodiment, the means for providing relative movement between the band and the movable dogs comprises hydraulic cylinder means mounted upon the band for rotating the dogs which are pivotally supported by the band. In another embodiment, the means for bringing about the relative movement comprises threaded bolt members for engaging the band and the dogs pivotally mounted upon the band.

The present device has the advantage that it is very quickly installed upon a pipe section and is readily operable for bringing about the correct alignment and support needed for welding. Also, access completely around the joint between the two pipe sections is provided.

It is accordingly an object of the present invention to provide an alignment clamp capable of coaxially aligning pairs of pipe sections, with the capability of rapid repetition of the clamping sequence.

It is another object of the present invention to provide an alignment clamp with leverage capacity suitable for alignment and support of large diameter pipe sections, i.e., of 48 inch diameter pipe and larger.

It is a further object of the present invention to provide an alignment clamp readily adjustable to special pipe sizes.

It is another object of the present invention to provide an alignment clamp wherein adjustable clamping leverages are possible so as to afford the rotatability of pipe sections in a semi-clamping arrangement before welding therebetween is accomplished.

It is another object of the present invention to provide an alignment clamp for pipe sections for use in large diameter pipe lines and the like including clamping devices which are hydraulically operated.

It is another object of the present invention to provide a combination alignment clamp and stabbing guide for a pipe piling.

It is another object of the present invention to provide an alignment clamp for use with pipe sections employing softer pipe materials, such as epoxy coated pipe.

It is another object of the present invention to provide an improved alignment clamp for pipe sections which requires the minimum of adjustment as the clamp is transferred from joint to joint.

It is another object of the present invention to provide an improved alignment clamp for pipe sections which is easily hand operated.

It is a further object of the present invention to provide an improved alignment clamp for pipe sections having the capability of correcting for high and low spots or out-of-round conditions of the pipe sections.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of a pipe alignment clamp according to the present invention;

FIG. 2 is a side view of the pipe alignment clamp according to a second embodiment of the present invention;

FIG. 3 is a partial end view of the FIG. 2 device;

DETAILED DESCRIPTION

Figure 5:
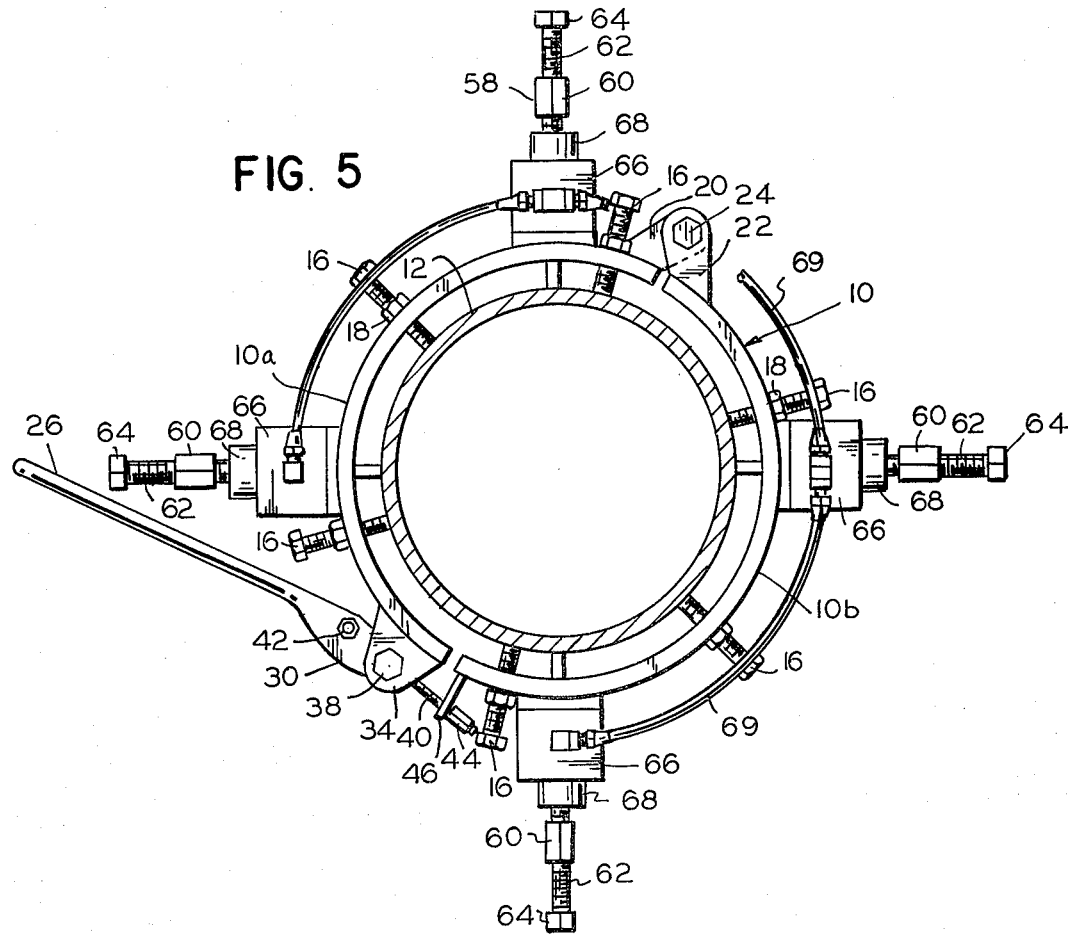
FIG. 5 is an end view of the FIG. 1 alignment clamp, such view being taken at 5—5 in FIG. 1.

Referring to the drawings and particularly to FIGS. 1 and 5, an alignment device according to a preferred embodiment of the present invention comprises a cylindrical steel band 10 adapted for attachment to a first pipe section 12 for bringing about the coaxial alignment between the same and a second pipe section 14 facilitating the welding together of the pipe sections. Pipe section 14 comprises an "ell" in the FIG. 1 embodiment, but may alternatively comprise a straight pipe, pipe fitting or the like. Band 10 is larger in inside diameter than the outside diameter of pipe section 12, and is provided with a plurality of centering bolts 16 disposed in rows near the forward and rearward edge of the band, and in diametrically opposing pairs on the opposite sides of the band. In the illustrated embodiment, these centering bolts are conveniently positioned at 60 degree intervals, although it is understood a greater or lesser number of centering bolts could be employed. Each bolt threadably engages a mating nut 18 welded into an aperture in band 10 whereby the bolt 16 may be rotated at its hex head from outside the band 10 for causing the forward end of the bolt to approach and engage the exterior of pipe section 12. In this manner, the band is securely held to pipe section 12, and by adjusting the bolts 16, irregularities and any out-of-round condition in the pipe section may be corrected.

The band 10 is composed of a pair of semi-circular segments 10a and 10b (seen most clearly in the FIG. 5 end view) which are hingedly connected. Overlapping hinge brackets 20 and 22 are welded at ends of segments 10a and 10b respectively, proximate the forward and rearward edges thereof, and the brackets are joined by a pivot bolt 24 extending therethrough in a direction parallel to the central axis of the band 10. Diametrically opposite bolt 24, the band is provided with a locking means, here comprising a lever 26 bifurcated at 28 and 30 where the same is pivotally engaged between ears 32 and 34 mounted upon the band 10. The lever rotates in a direction perpendicular to the axis of band 10 and about the axis provided by bolts 36 and 38 which pivotally connect the lever to ears 32 and 34.

A hooking member 40 extends between the bifurcated ends of lever 26 where it is pivotally secured therebetween by a bolt 42 at a point farther out the lever arm than the pivot provided by bolts 36 and 38. This hooking member is suitably threaded at the opposite end thereof where it receives an elongated hex nut 44 adapted to engage the remote side of a lug 46 provided with a slot through which hooking member 40 may extend. Lug 46 is mounted on semi-circular segment 10b. In locking the two segments 10a and 10b together, the hooking member 40 is inserted in the slot in lug 46 with the lever 26 disposed more or less radially outwardly from the axis of band 10. The lever 26 is then rotated in a clockwise direction, as viewed in FIG. 4, into an over-center locking position as illustrated. At this time, the centering bolts 16 should firmly engage the exterior of the pipe section 12.

Radially disposed about the band and toward the edge thereof proximate the joint between the two pipe sections are located upstanding steel ears 48 each of which pivotally support a lever type dog 50 having a forward end 52 adapted for grasping the side of second pipe section 14. The lever type dogs 50 are positioned in opposing, diametrically opposite pairs and a total of four are illustrated, although it is understood that a greater number could be employed if so desired particularly for large size pipe. The lever type dogs extend radially outwardly from the first end thereof in the region of the joint between the two pipe sections to provide an access area generally indicated at 54 permitting welding of the joint between the two pipe sections. In the particular embodiment, a lever type dog is L-shaped between the first end 52 and bolt 56 by means of which the dog is pivotally connected in each case to an ear 48. Although one ear 48 may be provided for each dog 50, it is preferred that a pair of such ears be disposed one on each side of the dog, with the bolt 56 extending therebetween and through an aperture in the dog. Each lever type dog further extends radially outwardly from the pivot provided, and then longitudinally again to a second end 58 onto which a hex shaped threaded nut 60 is welded. Threadably adjustable rods 62 engage nuts 58 and are each provided with a hex head 64 whereby the opposite end of each rod 62 is adjustable toward and away from the axis of band 10. Mounted therebelow on band 10 is a hydraulic cylinder 66 for operating a hydraulic piston rod 68 in the direction of the aforementioned adjustable rods 62, whereby to force the lever dogs about the pivot established by bolt 56 causing the first ends 52 thereof to grasp the exterior of second pipe section 14. The hydraulic cylinders 66 are supplied hydraulic fluid via a line 68 which suitably connects to a remote hand pump or, in conjunction with an air boosting cylinder, to a hydraulic system to permit rapid operation of the lever type dogs in clamping relation to pipe section 14. Coil springs 70 are disposed between the lever type dogs 50 and the band 10 proximate the forward end of the band next to the joint between the two pipe sections for normally urging the dogs away from pipe section 14.

In employment of the device described, the centering bolts 16 are adjusted for at least approximately engaging the side wall of a first pipe section 12, and the band 10, in unlocked open condition, is placed upon the pipe section 12. Then, the locking means is operated by inserting hooking member 40 into lug 46, and the lever 26 is rotated for drawing up the band 10 and producing firm engagement between centering bolts 16 and pipe section 12. The second pipe section 14 is moved into approximate coaxial relation with the first pipe section 12, and then the hydraulic cylinders are operated for immediately and simultaneously pivoting the dogs so that first ends 52 grasp the pipe section 14 in aligned coaxial relation. The adjustable rods 62 are employed for making initial adjustments, adjusting for out-of-round condition of pipe section 14 or the like. Welding is then accomplished around the joint between the two pipe sections, with access being had all the way around the joint including the space provided by opening 54.

Alternatively, in some situations it is necessary to employ variable clamping, so that pipe section 14 is held lightly in coaxial alignment but can be rotated to a specified orientation required in the pipe fabrication. For this purpose, an air pressure control valve which may be employed in regulating pressure to an air boosting cylinder as mentioned above provides a lesser pressure at first while the pipe section 14 is oriented, and then the air pressure control valve regulating pressure to the air boosting cylinder is increased to effect maximum delivery of clamping force to the clamping dogs.

When the welding has been accomplished, the hydraulic pressure is released, and spring 70 will force the lever type dogs 50 away from pipe section 14. Then, lever 26 is operated to unlock the band 10 and the two segments 10a and 10b are hinged apart so the band can be completely removed from pipe section 12. The same device can then be rapidly applied in the same manner described above to another pipe section along a pipe line. For example, the band 10 can then be attached to the remote end of pipe section 14. The centering bolts 16, substantially adjusted for the diameter of pipe being employed, will not have to be substantially readjusted for each clamping and welding operation, although as described above the same are useful in correcting for out-of-round conditions or the like. It is seen that with the device according to the present invention, rapid concentric clamping of pipe sections is achieved. This enables a considerable increase in the speed of welding joints in pipe line construction.

A second embodiment of the present invention is illustrated in FIGS. 2 and 3 and is utilizable especially for smaller sizes of pipe. This device is substantially similar to the one described in connection with FIGS. 1 and 5, and similar elements are referred to with the same or primed reference numerals. The device of FIG. 2 differs in that mechanically adjustable lever type dogs 50' are employed rather than hydraulically operated dogs, and the dogs are pivotally connected by means of bolts 56' to ears 48' positioned at diametrically opposite locations around band 10. The ears 48' are located on the far end of the band 10 from the joint between the two pipe sections 12 and 14', wherein section 14' comprises a pipe fitting in this illustration. The dogs 50' are nearly C-shaped, and the operating means comprise threaded adjustable bolts 70 which threadably engage long nuts 72 welded toward the approximate center of the C-shaped dogs 50', near the forward end of the band toward the junction between the two pipe sections. The threaded bolts 70 extend radially inwardly through apertures in band 10 and are provided on their under side with heads 74 preventing outward radial withdrawal of the bolts 70. The bolts are also surrounded by coil springs 76 which act to force the dogs 50' in an outward direction. The threaded bolts 70 also include hex heads 78 on the outwardmost end thereof which may be rotated for drawing up the lever dogs 50' to bring their first ends 52 into grasping engagement with pipe section 14'. The operation of the device illustrated in FIGS. 2 and 3 is slightly different from that of the device according to the first embodiment, in that the lever type dogs 50' are adjusted for the first welding of two pipe sections of a given diameter and then this adjustment is more or less maintained as subsequent pipe sections are welded, unless the need arises to compensate for an out-of-round condition. Thus, the band 10 is first placed on a pipe section 12, and lever 26 is rotated as hereinbefore described, with hooking member 40 engaging lug 46, for drawing up the centering bolts 16 against the exterior of pipe section 12. The centering bolts 16 are adjusted to compensate for undesired out-of-round of pipe section 12. Pipe section 14' is then approximately located, and bolts 70 are rotated until ends 52 of dogs 50' engage pipe section 14' for holding the same in coaxially aligned condition. After the welding is complete while the pipe sections are thus coaxially aligned, lever 26 is rotated in the reverse direction and the segments 10a and 10b of band 10 are hingedly rotated with respect to one another so the band can be removed from the area of the welded joint. Then, the same device can be employed to hold two pipe sections having substantially the same diameter without having to readjust bolts 70 to a material extent. Thus, the band 10 is merely locked in place by means of lever 26 with the pipe section 14' also in place and the lever type dogs 50' should at this time grasp the exterior of pipe section 14'. Some minor adjustment may be required, especially in the case of an out-of-round condition, but in general the utilization of this FIG. 2 embodiment is very rapid and does not require much adjustment from joint to joint.

Figure 4:
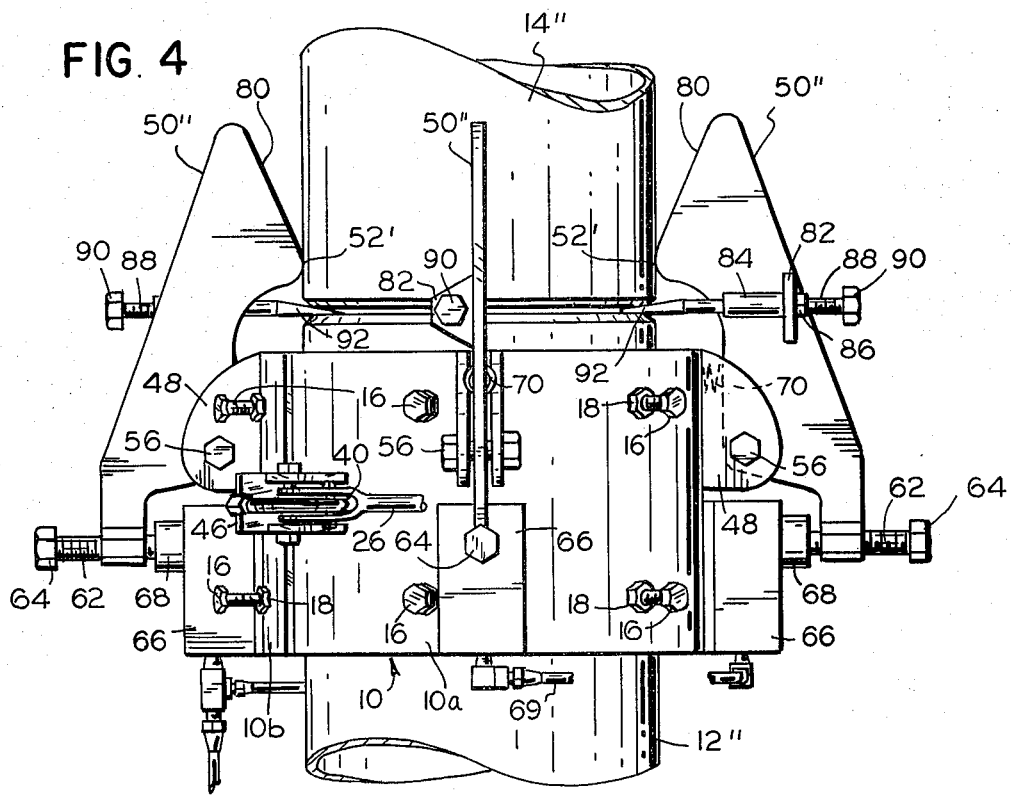
FIG. 4 is a side view of a pipe alignment clamp according to a third embodiment of the present invention particularly adpated for pipe pilings.

Referring to FIG. 4, yet another embodiment of the present invention is illustrated wherein like parts are referred to employing similar reference numerals. This embodiment is particularly adapted for pipe piling wherein the second section of pipe piling 14'' is to be welded upon a lower section of pipe piling 12''. The clamping device according to the present invention operates in substantially the same manner as hereinbefore described for the embodiment of FIGS. 1 and 5. The FIG. 4 embodiment is additionally provided with lever type dogs 50'' having first ends 52' for grasping pipe section 14'', but with the lever type dogs extending longitudinally beyond the said ends 52' where the dogs taper outwardly at 80 to provide a "stabbing guide" configuration for initially engaging the pipe section 14''. As the pipe section 14'' is lowered towards pipe section 12'', the tapered region 80 of the lever dogs guide the pipe section 14'' into place.

The lever dogs 50'' are further supplied with brackets 82 welded onto the sides thereof supporting tubular sleeves 84 and a nut 86 welded onto each bracket and threadably engaging a spacer 88 having a threaded shank and a head 90. The spacers extend through the tubular sleeves 84 and are tapered at their forward ends 92 where the spacers are adapted to engage the upper edge of pipe section 12''. The spacers are moved radially inwardly to the point where the tapered ends provide the spacing desired between pipe section 12'' and pipe section 14'' so that when the latter is lowered toward the former, the spacers will uphold pipe section 14'' until the joint has been tack welded. The spacers are thus used to separate the two pipes or piles from complete abutment allowing penetration of the root pass of the weld.

The hydraulically powered alignment clamping device is particularly effective in facilitating the coaxial alignment and welding of the pipe piles. It will be understood that the hydraulic pressure initially supplied is such that springs 70 force the dogs 50'' slightly further apart than the diameter of pipe section 14'' until the latter pipe section is lowered into place. At this time, the hydraulic cylinders are operated for firmly engaging the two pipe sections whereupon tack welding is accomplished and the spacers 88 are then rotated to remove them out of the way for the complete weld.

Figure 6:
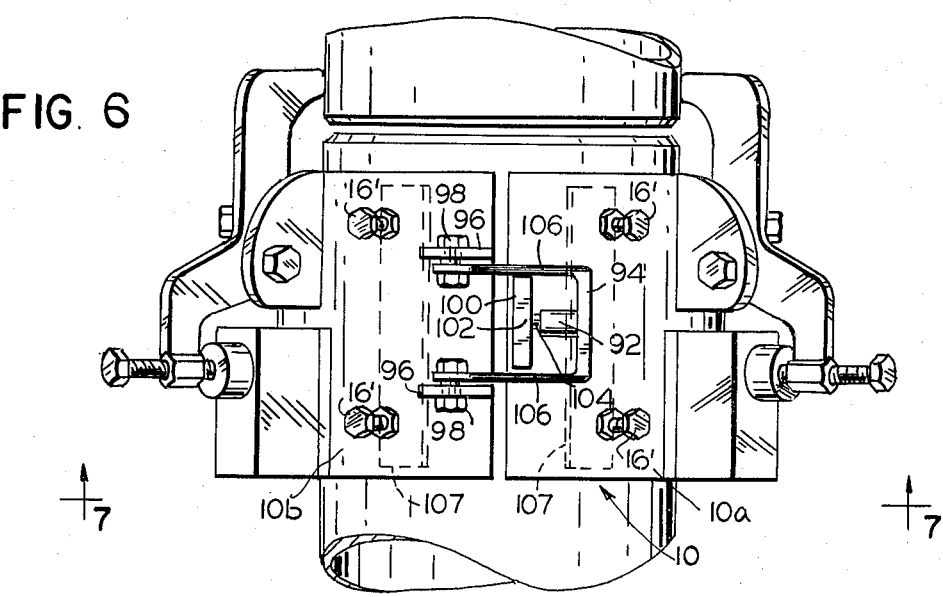
FIG. 6 is a side view of an alternative construction of a pipe alignment clamp according to the present invention including hydraulic locking means.
Figure 7:
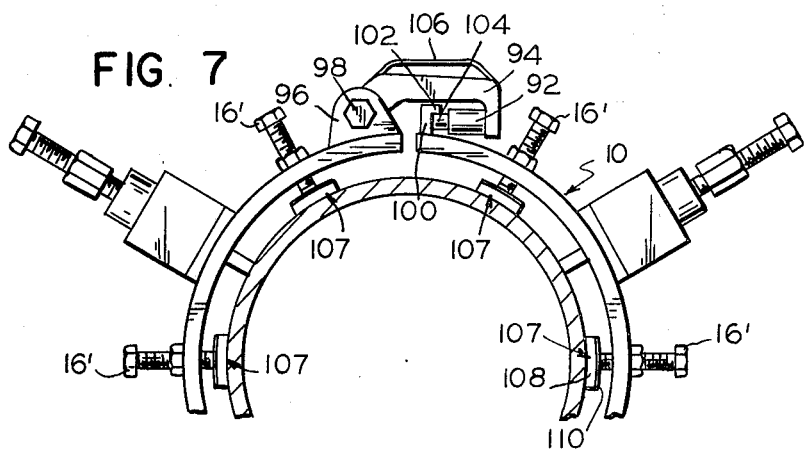
FIG. 7 is an end view partially broken away of the FIG. 6 device.
Figure 8:
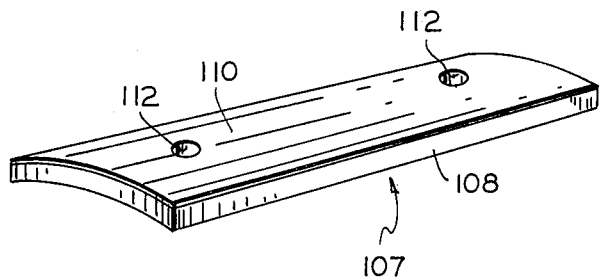
FIG. 8 is a prospective view of the softener shoe which may be employed in alignment clamps according to the present invention.

A further embodiment according to the present invention is illustrated in FIGS. 6–8, this embodiment illustrating additional or alternative features. In place of the previous locking device, a hydraulic locking device is employed which includes a hydraulic cylinder 92 mounted upon the U-shaped latch member 94. The latch member 94 is pivotally supported from upstanding ears 96 mounted upon semi-circular segment 10b of band 10 as by welding. Bolts 98 pivotally attach the latch member 94 to the ears. Also, the latch member is provided with handles 106 on the upper sides of the legs of the U. The latch member extends to the right in FIG. 6 past the location of a stop 100 welded onto semi-circular segment 10a and having a hooked portion 102 oriented to the right in FIG. 6 under which the piston rod 104 of hydraulic cylinder 92 may extend. The locking means of FIGS. 6 and 7 is operated by pivoting the latch member 94 into place so that the piston rod 104 is aligned underneath the hooked portion, and then operating hydraulic cylinder 92 such that the piston rod engages the stop 100. Hydraulic pressure from the cylinder 92 forces the semi-circular segments 10a and 10b toward one another. This device is suitable for use with heavy, large diameter pipes where the alignment clamping device itself is difficult to handle manually.

The embodiments of FIGS. 6 to 8 illustrate another variation according to the present invention which is desirable in the case of nonmetallic pipe surfaces, as for example epoxy coated pipe. Softener shoes generally indicated at 107 comprise a forward hard rubber surface 108 rounded or concave for engaging the outside of the pipe section and a rounded or concave rearward steel backing plate 110 provided with a pair of indentations 112 into which ends of longitudinally aligned centering bolts 16' may extend. It is understood one softener shoe is employed for a pair of centering bolts which are aligned toward the forward and rearward ends of the band 10.

While I have shown and described several embodiments of my invention, it will be apparent to those skilled in the art that many changes and modifications may be made without departing from my invention in its broader aspects. I, therefore, intend the appended claims to cover all such changes and modifications as fall within the true spirit and scope of my invention.

I claim:

1. A device for holding two sections of pipe in alignment for welding one to the other, such device comprising:
    a circumferential band removably securable to a first of said sections of pipe which is to be welded to a second of said sections of pipe,
    movable dogs mounted from said band and having forward ends for securely engaging the second of said sections of pipe, said dogs extending outwardly of the region of the joint between the two pipe sections to permit welding between the pipe sections,
    and operating means interengageable between said band and said movable dogs for bringing about the movement of the forward ends of said dogs toward the second of said pipe sections in supporting relation to the second of said pipe sections when said band is removably secured to the first of said pipe sections.

2. The device according to claim 1 wherein said operating means comprising hydraulic cylinders mounted on said band.

3. The device according to claim 1 wherein said operating means comprise threaded adjustable means disposed between said band and said dogs.

4. The device according to claim 1 wherein said band is disposed in spaced relation from the first of said pipe sections and provided with a plurality of centering means for adjustably spacing said band from the first of said pipe sections.

5. The device according to claim 4 wherein said centering means are provided with a plurality of shoes adapted to be urged toward the first of said pipe sections.

6. The device according to claim 1 wherein said band comprises a pair of hingedly connected segments provided with means for holding the sections together in clamping relation with the first of said pipe sections.

7. The device according to claim 6 wherein said holding means comprises an over center locking device.

8. The device according to claim 6 wherein said holding means comprises a hydraulic cylinder locking device.

9. The device according to claim 1 wherein said dogs extend axially of the second of said pipe sections beyond the forward ends of said dogs and taper outwardly from the second of said pipe sections to provide a stabbing guide configuration for initially engaging the second of said pipe sections.

10. The device according to claim 1 wherein said operating means comprises hydraulic cylinders interposed between said band and said movable dogs.

11. A device for holding two sections of pipe in alignment for welding one to the other, said device comprising:
    a circumferential band removably securable to a first of said sections of pipe proximate a first end thereof which is to be welded to a second of said sections of pipe,
    a plurality of lever dogs extending from said band and longitudinally of the first of said sections of pipe for peripherally securely engaging the second of said sections of pipe on the opposite side of the joint between the two sections of pipe from said band, said dogs each having a first contacting end for engaging the second of said pipe sections and extending outwardly in the region of the joint between said two pipe sections to provide a gap under said dogs to permit welding between said pipe sections,
    said band being provided with support means secured to said band and pivotally supporting said lever dogs for pivotal movement of the contacting ends in a radial direction toward and away from the exterior of the second of said pipe sections, and means for rotating said dogs relative to said band comprising operating means interengageable between said band and locations on said dogs spaced from said support means.

12. The device according to claim 11 wherein said operating means comprises plural hydraulic cylinders mounted upon said band and engaging said dogs for pivoting the same.

13. The device according to claim 12 wherein said hydraulic cylinders are mounted upon said band on the remote side of said support means from the joint between the two pipe sections, said dogs extending past said support means into engagement with the said hydraulic cylinders so that operation of said hydraulic cylinders forces second ends of said dogs outwardly for urging the first ends of said dogs toward the second of said pipe sections.

14. The device according to claim 13 wherein the said second ends of said dogs are provided with threadably adjustable means relative to said hydraulic cylinders for positioning the attitude of said dogs relative to one another.

15. The device according to claim 11 wherein said operating means comprises threaded adjustable means disposed between said band and said dogs for drawing up the first ends of said dogs toward the second of said pipe sections.

16. The device according to claim 15 wherein said threaded adjustable means are disposed between said support means and the edge of said band adjacent the joint between said pipe sections.

17. The device according to claim 11 wherein said band is larger in inside diameter than the outside diameter of the first of the said pipe sections and is disposed in spaced relation from the first of said pipe sections, said band being provided with a plurality of centering means engaging said band and positionable for mounting said band on the said first of said pipe sections.

18. The device according to claim 17 wherein said centering means comprise centering bolts threadably engaging said band and disposed in two circumferential rows proximate forward and rearward edges of said band.

19. The device according to claim 17 wherein said centering means are provided with a plurality of shoes engaged by said centering means inside said band and adapted to be urged toward the first of said pipe sections by said centering means to prevent damage to the first of said pipe sections.

20. The device according to claim 19 wherein said centering means comprise centering bolts threadably engaging said band and disposed in two circumferential rows of longitudinally aligned bolts proximate forward and rearward edges of said band, and including one such shoe for a pair of said centering bolts proximate the forward and rearward edges of said band in longitudinal alignment, said shoe comprising a hard rubber surface for engaging the first of said pipe sections and a steel backing for engagement by said centering bolts.

21. The device according to claim 11 wherein said band comprises a pair of hingedly connected semicircular segments provided with locking means substantially diametrically opposite the hinge connection therebetween.

22. The device according to claim 21 wherein said locking means comprises an over center locking device including a lever pivotally connected to one of said semicircular segments and carrying a hooking member pivotally connected to said lever, the second of said semi-circular segments having a lug adapted to engage said hooking member in an over center locking position.

23. The device according to claim 21 wherein said locking means comprises a latch member pivotally connected to one of said semi-circular segments, a stop member secured to the other of said semi-circular segments and beyond which said latch extends, and a hydraulic cylinder mounted upon one of said members for drawing said semicircular segments together.

24. The device according to claim 11 wherein said dogs are provided with springs engaging said band normally urging the first ends of said dogs outwardly from the second of said pipe sections.

25. The device according to claim 11 wherein said dogs extend axially of said second of said pipe sections beyond the said first contacting ends of said dogs which engage the second of said second pipe sections and taper outwardly from said second of said pipe sections to provide a stabbing guide configuration for initially engaging the second of said pipe sections.

26. The device according to claim 11 further including spacers adjustably mounted on said dogs, such spacers extending radially inward toward the joint between said pipe sections for initially spacing said pipe sections by predetermined amounts during initial welding.

27. The device according to claim 11 wherein said operating means comprise plural hydraulic cylinders interposed between said band and said dogs.

* * * * *